M. MILLER.
WATER METER.
APPLICATION FILED MAR. 28, 1908.

914,440.

Patented Mar. 9, 1909.
2 SHEETS—SHEET 1.

Witnesses:
Edythe M. Anderson.
Lillian A. Kibby.

Inventor:
Marshall Miller
By Sheridan and Wilkinson
Att'ys

M. MILLER.
WATER METER.
APPLICATION FILED MAR. 28, 1908.

914,440.

Patented Mar. 9, 1909.
2 SHEETS—SHEET 2.

Witnesses:
Edythe M. Anderson.
Lillian A. Kibby.

Inventor:
Marshall Miller
By Sheridan and Wilkinson
Att'ys

UNITED STATES PATENT OFFICE.

MARSHALL MILLER, OF ST. LOUIS, MISSOURI.

WATER-METER.

No. 914,440.

Specification of Letters Patent.

Patented March 9, 1909.

Application filed March 26, 1908. Serial No. 423,946.

*To all whom it may concern:*

Be it known that I, MARSHALL MILLER, a citizen of the United States, residing at St. Louis, in the State of Missouri, have invented certain new and useful Improvements in Water-Meters, of which the following is a specification.

The object of my invention is to provide a new and improved device adapted to measure a current of water flowing in a closed conduit, and which may be capable of actuating a chemical supply pump to add a chemical solution or mixture to a current of water in a definite proportion. This object and various other objects of detail will be made apparent in the following specification and claims, taken in connection with the accompanying drawings, in which—

Figure 1:
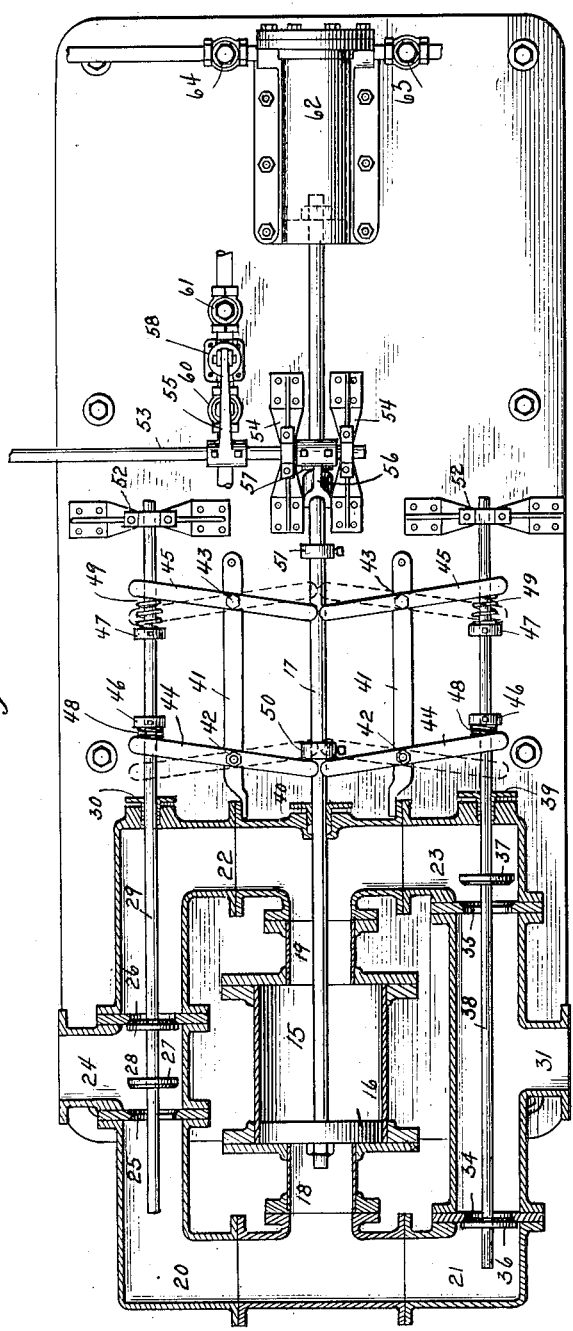
Figure 2:
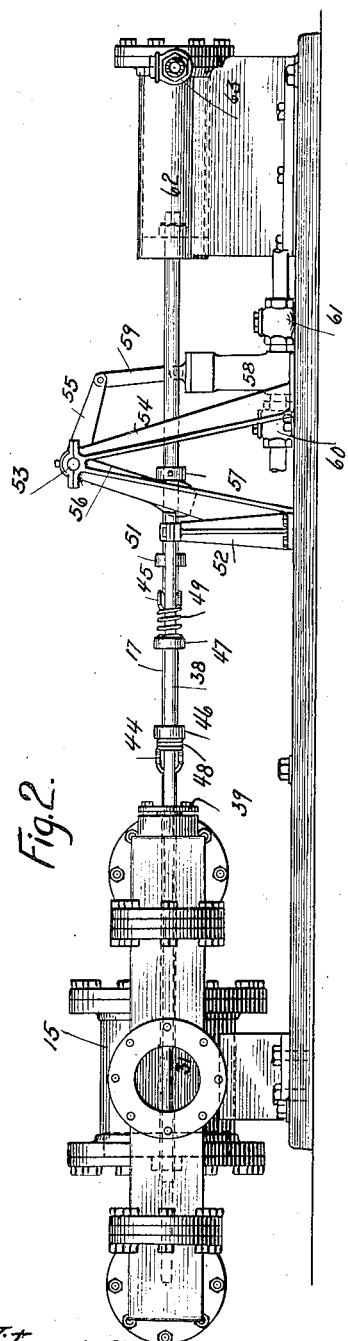
Figure 3:
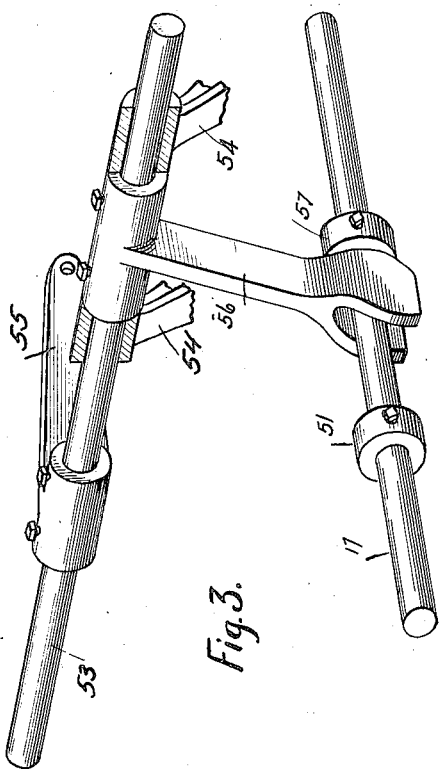

Figure 1 is a horizontal section of my improved device. Fig. 2 is a side elevation, and Fig. 3 is a perspective view of a detail.

In the art of purifying large quantities of water, it is desirable to mingle with the water a definite proportion of a chemical mixture or solution, and some times it is also desirable to inject air into water to be purified. Generally, the water goes to a settling tank or filter after the chemical mixture or solution is added to it. It is apparent that it is desirable to make the proportion of chemical to the water fairly constant. I have, therefore, provided a piston meter, the number of reciprocations of which is definitely proportional to the quantity of water flowing through the conduit in which the meter is interposed. The piston of this meter actuates a small pump, which by its reciprocation forces the chemical mixture or solution into the main current of water. For this use the meter should have certain characteristics which have been attained by my present invention.

Referring to the drawings, 15 is a cylinder within which a piston 16 connected to a piston rod 17 is adapted to reciprocate. At each end of the cylinder 15 conduits 18 and 19 are connected, the former having two branches 20 and 21 and the latter having the two branches 22 and 23. The two branches 20 and 22 are inlet branches leading from a common inlet passage 24. In these respective branches 20 and 22 are valve seats 25 and 26 adapted to be closed alternately by the puppet valves 27 and 28, which are fixed on the common valve stem 29, and this projects through the stuffing box 30 parallel with the main piston rod 17. On the opposite side of the cylinder 15 is the outlet conduit 31 into which the two outlet conduits 21 and 23 unite. One branch 21 has a valve seat 34 adapted to be closed by the valve 36, and the other branch 23 has a valve seat 35 adapted to be closed by the valve 37. These valves 36 and 37 are on a common stem 38 which projects through the stuffing box 39 in parallel relation to the main piston rod 17. It will be noted from an examination of Fig. 1 that the inlet valves 27 and 28 seat themselves by moving away from the main inlet conduit 24, and that the outlet valves 36 and 37 seat themselves by moving toward the main outlet conduit 31.

The stuffing box for the main piston rod 17 is indicated by the reference numeral 40. On either side of this, supports 41 are provided and on each of these are two pivots 42 and 43 which constitute fulcrums for the two levers 44 and 45. Each lever has forked ends—indicated in Fig. 2—the inner ends embracing the main piston rod 17 and the outer ends embracing one or the other of the two valve stems 29 and 38. On each valve stem there are two adjustable tappets 46 and 47 which lie spaced apart between the outer ends of the two levers 44 and 45. Between the tappet 46 and the adjacent end of the lever 44 is the coil spring 48 and between the tappet 47 and the corresponding end of the lever 45 is the coil spring 49. On the main piston rod 17 between the inner ends of all the levers is a single tappet 50. The outer ends of the valve stems 29 and 38 are supported by the brackets 52.

A transverse shaft 53 is supported in bearings in the brackets 54 and carries a crank 55 which connects through a link 59 with the plunger in the chemical pump 58. Another crank 56 on the same shaft 53 set at substantially right angles to the crank 55 is adapted to have its lower forked ends engaged alternately by the tappets 51 and 57 on the main piston rod 17. The chemical pump 58 has the inlet and outlet check valves 60 and 61. On its extreme outer end the main piston rod 17 carries a plunger which is adapted to reciprocate in the air pump cylinder 62; 63 and 64 being the inlet and outlet check valves, respectively.

With the parts as shown in the drawings, the water is flowing in through the passage 24 to the branch passage 20 and pushing the piston 16 to the right, while the water contained in the cylinder 15 is flowing out through the branch passage 23 to the main outflow conduit 31. This movement will continue until the tappet 50 on the main piston rod 17 strikes the inner ends of the two levers 45. When this happens, said levers will be quickly shifted to the positions indicated in dotted lines, thus compressing the springs 49 against the tappets 47 until the pressure becomes so great as to lift the valves 28 and 36 from their respective seats 26 and 34. It is to be remembered that the current of water flowing in through the passage 24 and out through the passage 31 is substantially constant. Immediately upon the lifting of the valve 28 from its seat 26, the current of water which is sweeping through the valve seat 25 will catch the valve 27 and quickly and firmly seat it. Similarly, the water flowing through the branch passage 23 will catch the valve 37 and seat it. It is at once apparent that the direction of flow of the water into the cylinder 15 and out therefrom will be reversed and the piston will be pushed back from the right to the left. The continued action of the pump will be apparent from the foregoing description. This meter can be interposed in the supply conduit at any point and not necessarily at the point where it empties into an open tank. It increases the back pressure on the moving column of water to scarcely a perceptible extent. The combination of positive means to unseat the valves and such an arrangement that they are then oppositely seated by the sweep of the current of water is very effective and avoids knocking at the ends of the stroke of the main piston 16. The mechanism by which the valves are actuated is strong and simple and is very easily accessible so that it can be repaired or readjusted without difficulty. The tappets 46 and 47 can be adjusted so that the springs 48 and 49 shall be put under the most appropriate tension for smooth work.

What I claim is:

1. In a device of the class described, a cylinder, a piston therein, a piston rod, a pair of inlet conduits leading to the respective ends of the cylinder on one side thereof, a pair of outlet conduits leading therefrom on the other side, valves for each of these conduits, all of said valves being adapted to be held to their seats by fluid pressure, valve stems, the valves on each side being on a common stem parallel to the main piston rod, tappets on each valve stem and on the main piston rod, and intermediately pivoted levers, each adapted to be engaged by a piston rod tappet at one end and by a valve stem tappet at the other end.

2. In a device of the class described, a cylinder, a piston therein, a piston rod connected thereto, inlet and outlet conduits connected to the cylinder on opposite sides thereof, an inlet valve stem on the inlet side, valves thereon, an outlet valve stem on the outlet side, valves thereon, two levers on each side, each having an intermediate fulcrum between the piston rod and valve stem, tappets on the piston rod adapted to engage the inner ends of the levers, tappets on the valve stems adapted to be engaged by the outer ends of the levers, and springs between the valve stem tappets and the corresponding ends of the levers.

In testimony whereof, I have subscribed my name.

MARSHALL MILLER.

Witnesses:
ANNA L. SAVOIE,
FLORENCE A. FLORELL.